United States Patent [19]
Nelson et al.

[11] Patent Number: 5,770,820
[45] Date of Patent: *Jun. 23, 1998

[54] PLENUM CABLE

[76] Inventors: Harry Nelson, 1520 Mallard Ct.; Douglas O'Brien, 3151 Forest Dr., both of Richmond, Ind. 47374; Robert D. Kenny, 2801 Southeast Pkwy., Richmond, Ind. 47375

[*] Notice: The term of this patent shall not extend beyond the expiration date of Pat. No. 5,514,837.

[21] Appl. No.: 646,506

[22] Filed: May 7, 1996

Related U.S. Application Data

[63] Continuation-in-part of Ser. No. 404,415, Mar. 15, 1995, Pat. No. 5,525,757, and Ser. No. 412,052, Mar. 28, 1995, Pat. No. 5,514,837.

[51] Int. Cl.⁶ .................................................. H01B 11/02
[52] U.S. Cl. .................................. 174/113 R; 174/121 A
[58] Field of Search ............................... 174/36, 110 FC, 174/110 PM, 115, 121 A, 113 R

[56] References Cited

U.S. PATENT DOCUMENTS

| | | |
|---|---|---|
| 529,559 | 11/1894 | Marsh . |
| 3,102,160 | 8/1963 | Cook et al. ............................. 174/105 |
| 3,489,844 | 1/1970 | Motley ..................................... 174/32 |
| 3,662,367 | 5/1972 | Deveau, Jr. et al. ................... 340/235 |
| 4,041,237 | 8/1977 | Stine et al. ............................... 174/36 |
| 4,408,443 | 10/1983 | Brown et al. ............................. 57/204 |
| 4,423,589 | 1/1984 | Hardin et al. ............................. 57/293 |
| 4,486,619 | 12/1984 | Trine et al. .............................. 174/34 |
| 4,500,748 | 2/1985 | Klein ................................. 174/121 A |
| 4,605,818 | 8/1986 | Arroyo et al. .......................... 174/107 |
| 4,697,051 | 9/1987 | Beggs et al. ........................... 174/63 D |
| 4,711,811 | 12/1987 | Randa ..................................... 428/383 |
| 4,873,393 | 10/1989 | Friesen et al. ............................ 174/34 |
| 4,963,609 | 10/1990 | Anderson et al. ....................... 524/413 |
| 4,969,706 | 11/1990 | Hardin et al. ......................... 350/96.23 |
| 5,001,304 | 3/1991 | Hardin et al. ............................ 174/107 |
| 5,010,210 | 4/1991 | Sidi et al. ................................. 174/34 |
| 5,024,506 | 6/1991 | Hardin et al. ......................... 350/96.23 |
| 5,074,640 | 12/1991 | Hardin et al. ............................ 385/109 |
| 5,162,609 | 11/1992 | Adriaenssens et al. .................. 174/34 |
| 5,173,960 | 12/1992 | Dickinson .............................. 385/100 |
| 5,202,946 | 4/1993 | Hardin et al. ........................... 385/109 |
| 5,245,134 | 9/1993 | Vana, Jr. et al. ..................... 174/117 F |
| 5,253,317 | 10/1993 | Allen et al. ............................. 385/109 |
| 5,298,680 | 3/1994 | Kenny ..................................... 174/36 |
| 5,378,856 | 1/1995 | Allen ................................. 174/120 R |
| 5,401,908 | 3/1995 | Rodeghero ............................. 174/112 |
| 5,424,491 | 6/1995 | Walling et al. ..................... 174/113 R |
| 5,493,071 | 2/1996 | Newmoyer ......................... 174/113 R |
| 5,514,837 | 5/1996 | Kenny et al. ....................... 174/113 R |
| 5,525,757 | 6/1996 | O'Brien ............................. 174/121 A |

*Primary Examiner*—Kristine L. Kincaid
*Assistant Examiner*—Chau N. Nguyen
*Attorney, Agent, or Firm*—Laff, Whitesel, Conte & Saret, Ltd.

[57] ABSTRACT

A plenum cable having a plurality of twisted pair conductors with at least one pair having a non-fluorinated polyolefin insulation and all of the twisted pair conductors which are adjacent to each other having a lay length of about 0.4 to 4" with the preferred lay length being 0.4 to 1.25 inches. The lay length of the non-fluorinated polyolefin twisted pair conductor is preferably 1.0 to 1.25 inches and the lay lengths of the fluorinated polyolefin twisted pair conductors is preferably 0.5 to 85". The twisted pair conductor insulation is preferably radially joined along the entire length thereof. Preferably, the twisted pair conductors all have an impedance of 90 to 110 ohms and the impedance does not vary by more or less than ±0.05 of an average impedance. Also, the twisted pair conductors preferably have a center-to-center distance that does not vary by more or less than ±0.03 of an average center-to-center distance. Also, for another embodiment, all the adjacent twisted pair conductors have a dielectric constant within ±0.25 of each other.

1 Claim, 1 Drawing Sheet

PLENUM CABLE

This application is a continuation-in-part of application Ser. No. 08/404,415, filed Mar. 15, 1995 now U.S. Pat. No. 5,525,757 and Ser. No. 08/412,052, filed Mar. 28, 1995 now U.S. Pat. No. 5,514,837.

FIELD OF THE INVENTION

The invention relates to a cable having mixed dielectric twisted pair conductors and more particularly to a data cable having a plurality of twisted pair conductors in a common jacket with at least one twisted pair cable having a larger twist than one or more of the adjacent twisted pair conductors such that adjacent twisted pair conductors do not interferingly nest and thereby eliminating and/or reducing attenuation and/or cross-talk between adjacent twisted pair conductors.

This invention also relates to the above twisted pair conductors especially being used in plenum cables which have a plurality of twisted pair conductors with at least one twisted pair conductor insulated with extrudable flame retardant non-fluorinated polyolefin compositions. The twisted pair conductors are particularly suitable for use in high performance plenum cables meeting EIA/TIA category-5-type requirements.

BACKGROUND OF THE INVENTION

Generally, plenum cables have a plurality of twisted pair conductors surrounded by a jacket. The twisted pairs generally all have the same twist or substantially the same twist. U.S. Pat. No. 3,102,160 shows the use of joined twisted pairs having different lay lengths, but does not suggest adjusting the lay lengths of adjacent twisted pairs to prevent interfering nesting of the adjacent pairs and does not suggest using lay lengths of between 0.4 to 4.0 inches and a preferred lay length where one adjacent twisted pair has a lay length of about 1.0 to 1.25 inches and the other adjacent twisted pairs having a shorter lay length of between 0.5 and 1.0 inches.

Plenum cables are generally used in buildings where fire codes require flame retardant cables. The insulation can be made of several types of flame retardant insulation. A typical and widely used flame retardant insulation for conductors in data plenum cables is fluorinated ethylene-propylene (FEP Teflon®). Other fluorinated polyolefins such as tetrafluoroethylene (FFE), ethylene chloro-trifluoroethylene and copolymers of tetrafluoroethylene with a perfluoroalkoxy. Examples of the copolymers of tetrafluoroethylene with a perfluoroalkoxy are Ausimont's PFA and Ausimont's MFA. The fluorinated polyolefin insulation is presently in short supply and is somewhat difficult to extrude. Thus, special extrusion equipment is needed to extrude the fluorinated polyolefins.

By replacing at least one of the non-foamed fluorinated polyolefin insulations with a foamed or non-foamed non-fluorinated polyolefin dielectric or a foamed fluorinated polyolefin dielectric some of the above problems would be eliminated or substantially reduced.

The present invention provides plenum cables having at least two twisted pair conductors wherein one twisted pair conductor has a predetermined long lay length and the other twisted pair conductor has a predetermined shorter lay length that prevents and/or substantially reduces nesting between adjacent pairs. Further, the present invention is directed to providing plenum cables wherein one or more twisted pair conductors have an insulation other than a fluorinated polyolefin.

SUMMARY OF THE INVENTION

The present invention provides a plenum cable having a plurality of twisted pair conductors wherein at least one twisted pair conductor has a non-fluorinated polyolefin dielectric and has a first predetermined lay length and a second adjacent twisted pair has a second predetermined lay length which is shorter than the first lay length and said first and second lay lengths being sized to prevent interfering nesting by the adjacent twisted pair conductors.

Another aspect of the invention is a cable having at least two twisted pair conductors wherein at least one of the twisted pair conductors has a fluorinated polyolefin insulation thereon and at least one other twisted pair conductor has a non-fluorinated polyolefin insulation thereon and all of the twisted pair conductors have a lay length of between 0.4 to 4.0 inches with said non-fluorinated polyolefin insulated twisted pair conductors having a lay length longer than the lay length of adjacent twisted pair conductor to prevent interfering nesting between adjacent conductors.

A further aspect is a plenum cable as described above wherein at least one of the twisted pair conductors has a non-fluorinated polyolefin flame retardant insulation that contains a flame retardant polypropylene, a very low density polyethylene, at least one of high density polyethylene, and low density polyethylene and a halogen and a non-halogen flame retardant.

Further, another aspect is where the above twisted pair conductor insulation is a non-fluorinated polyolefin base resin that is preferably a single or blended polyolefin base which not only provides smooth extrusion and low head pressure but also provides the level of flame retardant needed for insulated conductors in a plenum cable. A typical non-fluorinated polyolefin composition of the present invention will contain a polyolefin blend of a polypropylene resin, a high and/or low density polyethylene and a very low density resin.

Still another aspect of the present invention is to provide a cable having at least one first twisted pair conductors with a differing lay or twist from adjacent pairs of twisted pair conductors, whereby the adjacent pair of twisted pair conductors will not interferingly nest in juxtaposition with the first pair of twisted pair conductors. This utilization of twisted pair conductors having differing lays within the range of 0.4 to 4.0 inches and especially between 0.4 to 1.25 inches reduces or eliminates attenuation, cross-talk and other problems normally found in twisted pairs of data carrying conductors with non-fluorinated insulations found in common jackets.

Similarly, the use of the above differing lays in adjacent twisted pair conductors reduces or eliminates the problems caused by differing dielectric constants in juxtaposed or adjacent data carrying twisted pair conductors. By taking advantage of this facet of this invention it is possible to reduce the thickness of the insulation on at least one of adjacent twisted pair conductors, thereby resulting in efficiencies in the cost of wire manufacture.

Another aspect of the present invention is providing at least two of the twisted pair conductors with different insulations of foamed or non-foamed insulations selected from fluorinated ethylene propylene, tetrafluoroethylene, ethylene chlorotrifluoro-ethylene, copolymers of tetrafluoroethylene with a perfluoro-alkoxy, non-fluorinated polyolefins and flame retardant non-fluorinated polyolefin compositions. Preferably all of the insulated conductors have a dielectric constant within ±0.25 of each other and the twisted pair conductors have integral insulations connected via a radial web or bonding along the entire length of the twisted pair conductors.

In still another aspect of the present invention, the twisted pair conductors have their insulation being radially joined together along the entire length of their dielectric layers. The conductors and corresponding dielectric layers are twisted substantially along the entire length of the twisted pair conductors to provide twisted pair conductors with an impedance of about 90 to 110 ohms when measured over a 1000 ft. length at a frequency of about 10 MHz to about 200 MHz and/or a center-to-center conductor distance in the twisted pair conductors that at any point along the twisted pair conductor does not vary by more than ±0.03 of an average center-to-center distance. The impedance is within a tolerance of an average impedance of no greater than ±0.05 times the average impedance.

The average impedance being:

1. an average impedance of at least 200 impedance measurements on one of twenty consecutive 1000 ft twisted pair conductors of the same size with the at least 200 impedance measurements being taken in less than 0.5 MHz increments, or
2. an average of at least one impedance measurement from each of twenty randomly selected 1000 ft. twisted pair conductors of the same size, taken from three separate successive runs with each run being at least 24 hours apart from each other, or
3. an average of at least one impedance measurement on each of at least twenty 1,000 ft. twisted pair conductors of the same size taken from the same run.

The average center-to-center distance being:

1. an average of at least 20 measurements taken on each of at least three to twenty 1000 ft twisted pair conductors of the same size taken from the same run, or;
2. an average of at least 20 measurements taken on each of at least one to six twisted pair conductors of the same size taken from three separate successive runs with each run occurring on a separate day.

Other objects of the present invention will become apparent from the following drawing and detailed description of the invention and the accompanying claims.

DETAILED DESCRIPTION OF THE INVENTION

Figure 1:
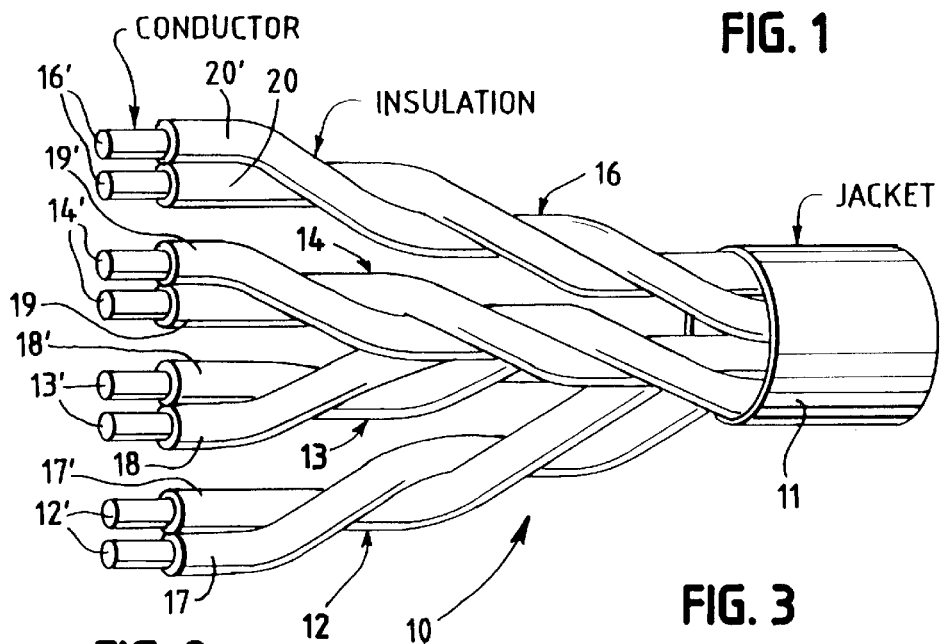
FIG. 1 shows a partial perspective view of a cable of the present invention.

FIG. 1 shows a plenum data cable 10 having four twisted pair conductors 12, 13, 14, and 16 in a common jacket 11 with at least one twisted pair conductor having a longer twist or lay length than adjacent twisted pair conductors. The "term" lay length relates to the distance between successive complete twists or 360° revolution of an insulated conductor in a particular twisted pair conductors.

The long lay length twisted pair conductor has a lay in the range of from 1.0" to 1.25". The term lay length refers to the length measurement it takes for a complete revolution of one conductor, i.e., a 1.0" lay length means there is a 360° revolution every 1.0 inch. The short lay length twisted pain has a preferred lay length in the range of from 0.4" to 1.0" with the most preferred short twist being in the range of from 0.5" to 0.875" that is preferably a three hundred sixty degree twist or revolution every 0.5 to 0.875 inches.

Each twisted-pair has conductors 12', 13', 14', 16' which may be any suitable data transmission conductor and a dielectric insulation 17, 17', 18, 18', 19, 19' and 20, 20', covering the respective conductors.

In this embodiment, the twisted pair conductor 12 is insulated with a non-fluorinated polyolefin dielectric insulation 17, 17' and the twisted pair conductors 13, 14, 16 all have fluorinated polyolefin insulations.

Each twisted pair conductor 12, 13, 14 and 16 preferably has substantially the same transmission delay from each other and varies ±6% or by less than 30 nano seconds over a 100 meter length of the twisted pairs. The matching skew is achieved by the insulation and/or the amount of twist an each twisted pair.

When referring to FIG. 1, a typical plenum cable has four or more twisted pair conductors. In the present invention at least one of the twisted pair conductors has insulation which is radially joined along the length thereof and is a non-fluorinated polyolefin or a foamed fluorinated polyolefin. When the twisted pair conductors have non-foamed fluorinated insulation radially joined along the length thereof, the preferred non-foamed fluorinated polyolefins are selected from fluorinated ethylene propylene (FEP) tetrafluoroethylene (TFE), ethylene chloro-trifluoroethylene, and copolymers of tetrafluoroethylene with a perfluoroalkoxy. Examples of the copolymers are Ausemont's PFA and Ausemont's MFA.

The preferred foamed fluorinated polyolefins are also selected from fluorinated ethylene propylene (FEP), tetrafluoroethylene (TFE), ethylene chloro-trifluoroethylene, and copolymers of tetrafluoroethylene with perfluoroalkoxy.

The flame retardant non-fluorinated polyolefins are selected from flame retardant polyethylene and flame retardant polypropylene as hereinafter set forth.

The foamed fluorinated or non-fluorinated flame retardant polyolefins are foams which have void space of 10 to 18% and are sometimes referred to as "partially foamed" insulations.

Figure 4:
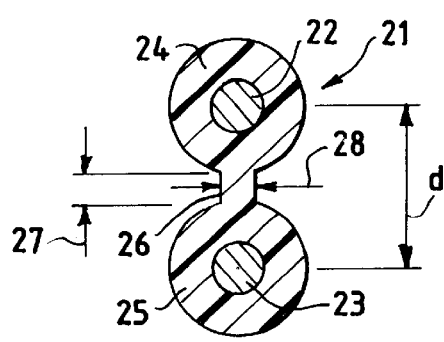
FIG. 4 is an enlarged cross-sectional view taken of one of the twisted-pair conductors used in the present invention.

The twisted pairs 12, 13, 14 and 16 preferably have the construction noted in FIG. 4. FIG. 4 illustrates a twisted pair 21 having two solid, stranded or hollow conductor wires 22 and 23. The conductors are solid metal, a plurality of metal strands, an appropriate fiber glass conductor, a layered metal or combination thereof. Each conductor 22 and 23 is surrounded by a respective dielectric or insulating cylindrical layer 24 and 25. Each of the conductors 22 and 23 is disposed centrally within the corresponding insulation 24 and 25. The conductors may, if desired, adhere to any degree against the inner walls of the insulation by any suitable means, such as by bonding, by heat or adhesives.

The insulations 24 and 25 are preferably integral with each other and are radially joined together along their lengths in any suitable manner. As shown, the joining means is a solid integral radial web 26 which extends from the diametric axis of each insulation. The width 27 of the web is in the range of from about 0.00025 to about 0.150 inches. The thickness 28 of the web is also in the range of from about 0.00025 to about 0.150 inches.

The diameter (traditionally expressed in AWG size) of each of the conductors 22 and 23 are preferably between about 18 to about 40 AWG.

The conductors 22 and 23 may be constructed of any suitable material, solid or strands, of copper, metal coated substrate, silver, aluminum, steel, alloys or a combination thereof. The thickness of each dielectric layer or insulation 24 and 25 is in the range of from about 0.00025 to about 0.150 inches.

The twisted pair 21 can be bonded together by an appropriate adhesive or the adjacent dielectrics can be bonded together by causing material contact while the dielectrics are at elevated temperatures and then cooling.

The bonding or web 26 are such that the dielectric layers can be separated and remain intact with an adhesion strength of not more than 5 lbs. force.

Figure 2:
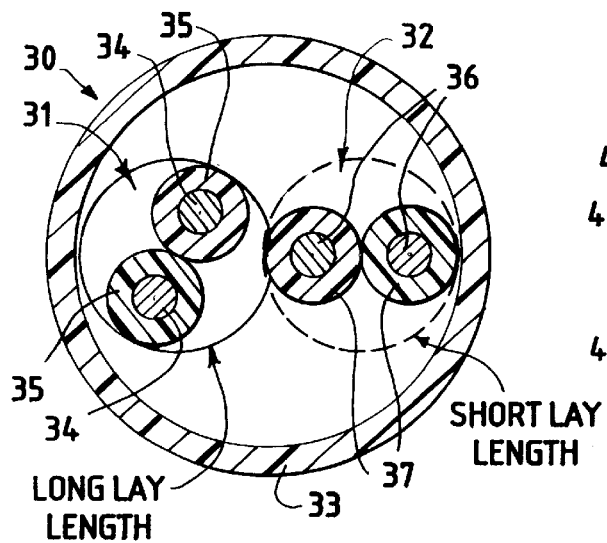
FIG. 2 is a similar cross-sectional view of two pairs of data carrying cables utilizing the concept of the present invention wherein each of the two pairs of cables has a different lay or twist from the adjacent pair within a common jacket.

Referring to FIG. 2, there is illustrated a plenum cable 30 having two twisted pair conductors 31 and 32 enclosed by jacket 33. The twisted pair conductors 31 and 32 preferably are constructed as radially joined twisted pair conductor 21 of FIG. 4. Twisted pair conductor 31 has conductor 34 with a non-fluorinated polyolefin dielectric insulation 35 and a long lay length of 1.0 to 1.25 inches. Twisted-pair cable 32 has conductors 36 with a fluorinated polyolefin dielectric insulation 37 and a short lay length of 0.4 to 1.0 inches.

Figure 3:
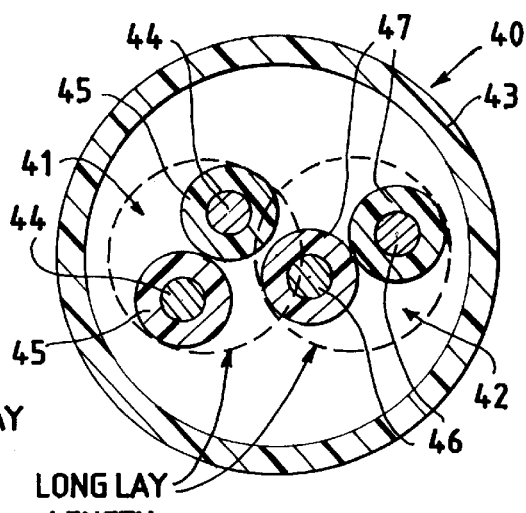
FIG. 3 is a similar cross-sectional view of the standard design cable in which two pairs of twisted data carrying cables internest.

Referring to FIG. 3, this illustrates a known plenum cable 40 having two twisted pair conductors 41 and 42 enclosed by jacket 43. Twisted pair conductor 41 has conductors 44 with a non-fluorinated polyolefin insulation 45. Twisted pair conductor 42 has conductors 46 with a fluorinated polyolefin insulation 47. Both twisted pair conductors 41 and 42 have the same lay lengths. As a result, the cables 41 and 42 tend to interferingly internest together.

When twisted pair conductors within a cable contain multiple dielectrics, a negative effect can occur with regards to attenuation. This is because the dissipation factor of higher dielectric pairs can negatively effect the performance of adjacent pairs insulated with lower dielectric materials. The closer the proximity of the lower dielectric pair(s) to the higher dielectric pair(s), the more noticeable the effect on said pair(s).

To counter this effect, this invention proposes to configure a data cable utilizing multiple twisted pair conductors of various lay lengths and with the highest dielectric pairs containing shorter lay lengths when compared to the lower dielectric pair(s). By utilizing this configuration, it will be more difficult for lower dielectric pairs to nest into pairs containing higher dielectric materials. Ultimately, this will increase the amount of air between said pairs, reducing the negative impact to attenuation from the higher dielectric pair's increased dissipation factor.

Thus, this aspect of the invention permits the use of less insulation materials, as the walls of lower dielectric insulation will not have to be increased either as to quality of materials or thickness of lesser quality material. This would be a definite advantage to eliminate the need for added cost for a higher quality dielectric material or to require the use of increased thickness of lower quality dielectric materials resulting in higher amounts of dielectric material required to be extruded around each wire to obtain similar results.

The jackets 11, 33 and 43 are made from any acceptable jacket material used for plenum cables. Some of the most widely used compositions are an extruded polyvinyl chloride, fluorinated ethylene propylene, tetrafluoroethylene and Flammarrest®.

The conductor insulation may be made from all of the same material or from different insulation materials. Preferably at least one of the twisted pair conductors has the non-fluorinated polyolefin insulation composition. Although FIG. 1 shows a plenum cable having four twisted pair conductors enclosed by a jacket, any number of twisted-pair conductors may be used. Also, any known additional construction for the plenum cable, i.e., filler, shielding, drain wire etc., is considered as a part of this disclosure.

The flame retardant polyethylene may be the flame retardant polyethylene disclosed in U.S. Pat. No. 5,358,991 or any other known flame retardant polyethylene for plenum cables.

The flame retardant polypropylene insulation is preferably a blend of polypropylene resin, a very low density resin such as very low density polyethylene, and a high and/or low density polyethylene.

The insulation compositions of the twisted pair conductors in many instances combine with each other and with the jacket compositions to provide effective flame and smoke control.

The polypropylene resin provides structural strength and crush resistance to the flame retardant polyolefin composition. The amount of polypropylene present in the polyolefin composition used to form the insulation is from about 50 to about 85 parts by weight of polypropylene per hundred parts by weight of the polyolefin blend used. An example of a suitable polypropylene is PP7382 GE7 which is manufactured by Exxon and which has a density of 0.90 g/cc and melt flow rate of 4 g/10 min.

The very low density resin provides impact and low temperature performance. A preferred very low density resin is very low density polyethylene (VLDPE). VLDPE has a nominal density of below 0.910 g/cc and preferably in the range of 0.880 to 0.910 g/cc. The amount of very low density polyethylene present in the polyolefin composition is from about 10 to about 40 parts by weight VLDPE per hundred parts by weight of the polyolefin blend. An example of a very low density polyethylene is Exact 3022 made by Exxon and which has a melting point of 94° C., a density of 0.905 g/cc and a melt index (MI) of 9 g/10 min.

The polyolefin blend may also include a high and/or low density polyethylene in an amount of from about 5 to about 20 parts by weight per hundred parts by weight of the polyolefin blend. The low density polyethylene (LDPE) has a nominal density in the range of 0.910 to 0.925 g/cc. The high density polyethylene (HDPE) has a nominal density in the range of 0.941 to 0.965 g/cc. The high density polyethylene used as an example in my invention is Union Carbide's DGDL 3364 (previously DGDK 3364) which has a density at 23° C. of 0.945 g/cc, and an MI of 0.75 g/10 min.

The low density polyethylene used as an example in my invention is Union Carbide DFDA 6005 which has a density of 0.920 g/cc, an MI of 0.2 g/10 min., and a peak melting point of about 106° C.

The overall melt flow of the polyolefin blend is typically around 3.5 to 4.9 g/10 min under ASTM D1238 standards, i.e. at 230° C. and a force of 2.16 Kg. This provides milder extrusion pressure and smoother flow in the die.

The specific gravity of the polyolefin blend is about 0.918.

The polyolefin composition contains a flame retardant added to the polyolefin blend. The flame retardant is generally a mixture of halogen flame retardant chemicals, non-halogen flame retardant chemicals and a flame retardant intumescent composition. The flame retardant mixture generally contains from about 6 to about 20 parts by weight of halogen flame retardant per hundred parts by weight of the polyolefin blend and from about 20 to about 60 parts by weight of non-halogen flame retardant per hundred parts by weight of the polyolefin blend.

The preferred halogenated flame retardant is a chlorinated cyclooctene such as chlorinated dimethanodibenzocyclooctene. The specific compound is Dechlorane ±35 which is dodecachloro-dodecahydro-dimethanodibenzocyclooctene. The chlorinated cyclooctene has a particle size of no greater than 12 microns. The halogenated flame retardant may be also selected from chlorinated wax, bromochloro wax, etc.

Dechlorane +35 is used in the polyolefin composition in an amount of from about 5 to about 15 parts by weight per hundred parts by weight of the polyolefin blend. Dechlorane +35 has a melting point of 350° C. and is made by Occidental Chemicals.

The non-halogenated flame retardant may be selected from one or more of the following compounds zinc borate, aluminum trihydrate, magnesium hydroxide, zinc stannate, magnesium stearate, ammonium octamolybdate and zinc stearate.

The preferred non-halogen flame retardant is a mixture of a first non-halogen flame retardant, a second non-halogen flame retardant and a flame retardant intumescent.

The first non-halogen flame retardant is selected from one or more of zinc borate, zinc stearate, magnesium stearate, ammonium octamolybdate and zinc stannate. The preferred first non-halogen flame retardant is zinc borate. Zinc borate in the polyolefin composition is used in an amount of from about 12 to about 36 parts per by weight of zinc borate per hundred parts by weight of the polyolefin blend and is preferably about 24 parts by weight per hundred parts by weight of the polyolefin blend. In the preferred embodiment, ZB-467 Lite by Anzon is used. This is a non-hygroscopic free-flowing powder having an average particle size of 1.5 microns, a water solubility of 0.1 g/100 ml, a specific gravity of 2.74 and a refractive index of 1.59. Anzon has indicated that the formula is $4 \cdot ZnO \cdot 6B_2O_3 19 \ 7H_2O$.

The second non-halogen flame retardant is selected from one or more of magnesium hydroxide and magnesium stearate. The preferred second non-halogen flame retardant is FR-20 MHRM 105 which is magnesium hydroxide coated with 2% stearic acid.

The stearic acid coated magnesium hydroxide was obtained from Ameribrom under the tradename FR-20 MHRM-120. This is used in an amount of 8 to 24 parts by weight per hundred parts by weight of the polyolefin blend.

The flame retardant intumescent composition is a silicone polymer dispersed on a fumed silica. The preferred silicone composition used is Dow Corning's 4-7081 resin modifier which has been described as a silicone powder which has both vinyl and acrylate functionality. This is used in an amount of from about 4 to about 12 parts by weight per hundred parts by weight of the polyolefin blend.

The stabilizer in the polyolefin composition provides protection from degradation. A typical composition contains one or more hindered phenolic stabilizers and may have a secondary stabilizer. The hindered phenolic stabilizers are used in an amount of from 0.2 to 2.0 parts by weight per hundred parts by weight of the polyolefin blend. The primary hindered phenolic stabilizer in the polyolefin composition is used in an amount of from about 0.15 to about 0.5 parts by weight per hundred parts by weight of the polyolefin blend and is preferably about 0.15 parts by weight. An example of a primary stabilizer is Irganox 1010 made by Ciba Geigy. Ciba Geigy has indicated that this is tetrakis [methylene (3,5-di-tert-butyl-4hydroxyhydrocinnamate)] methane. Likewise, the secondary hindered phenolic stabilizer is present in the polyolefin composition in an amount of from about 0.1 to about 0.5 parts by weight per hundred parts by weight of the polyolefin blend and is preferably about 0.25 parts by weight per hundred parts by weight of the polyolefin blend. An example of a secondary hindered phenolic stabilizer is Irganox MD 1024 by Ciba Geigy which has been described as having the formula 1,2-bis (3,5-di-tert-butyl-4 hydroxyhydrocinnamate) hydrazine.

Additional stabilizers are calcium stearate and Chemisorb 944 each used in an amount of about 0.05 to about 0.2 parts by weight per hundred parts by weight of the polyolefin blend and preferably about 0.10 parts by weight. The calcium stearate was purchased from Witco Chemical Company; Chicago, Ill. The Chemisorb 944, which is a polypropylene stabilizer, was purchased from Ciba Geigy.

The following Example illustrates the current non-fluorinated polyolefin insulation formulation.

| Material | Mfg | Type | Parts by Weight | Ranges |
|---|---|---|---|---|
| PP7382 | Exxon | PP | 70 | 50 to 85 |
| Exact 3022 | Exxon | VLDPE | 20 | 10 to 40 |
| DGDL 3364 | Union Carbide | HDPE | 10 | 5 to 20 |
| Dechlorane +35 | Occidental | Chlorinated | 12 | 6 to 20 |
| 4-7081 | Dow Corning | FR Intumescent | 7.8 | 4 to 12 |
| ZB-67 lite | Anzon | FR Non-Halogen | 24 | 12 to 36 |
| FR-20 MHRM 105 | Ameribrom | FR Non-Halogen | 12 | 8 to 24 |
| Irganox 1010 | Ciba Geigy | Hindered Phenolic | 0.15 | .1 to .5 |
| Irganox MD 1024 | Ciba Geigy | Stabilizer | 0.25 | .1 to .5 |
| Calcium Stearate | Witco | Stabilizer | 0.10 | .05 to .2 |
| Chemisorb 944 | Ciba Geigy | Stabilizer | 0.10 | .05 to .2 |

The compounding of the above materials is preferably processed at a temperature of 160° C. to 180° C. Likewise, the above materials are preferably extruded at temperatures between 175° C. to 210° C. onto conductors to prepare the insulated conductors. The plenum cable and twisted pairs are prepared by known procedures.

Each of the twisted pair insulated conductors is preferably prepared by extruding insulation over two wires simultaneously and then adhering the two insulated conductors via bonding, webbing, or other suitable means. The adjoined insulated conductors are twisted to produce the desired number of twists per paired wire cable length.

The twisted pair conductors of FIGS. 1, 2 and 4 provide for relatively error free transmissions within most frequencies utilized by LAN systems.

Various tests for attenuation, impedance, crosstalk and skew (measured in nano seconds per 100 meters) have been applied to samples of the invention and results are tabulated below. One term used is not commonly known except in the field of quality control. Thus the term Cp or Cpk is a measure of the capability of a process to produce a product within the tolerance limits. Cp doesn't take into account where the process is centered within the tolerance, Cpk does.

Cp=the tolerance divided by 6 standard deviations of the process. A process with 6 standard deviations (6SD) equal to the tolerance will have a Cp of 1. To find the Cpk divide the distance between the process mean and the upper or lower tolerance levels by 3SD, Cpk is the lesser result of the two calculations.

Any process with a Cp or Cpk less than 1 is incapable of reliably producing within tolerance. The higher the Cpk the more room there is for the mean and or the variance to shift without producing out of tolerance product. A process with a Cp of 1.33 has a safety margin of 2SD—assuming the mean is centered between the tolerance limits the plus and minus 3SD points on the distribution will be 1SD inside the tolerance limits.

In the following tables:

(a) the blue (Blu) twisted pair has a lay length of 0.5" and the blue insulation is Teflon;

(b) the green (Grn) twisted pair has a lay length of 0.875" and the green insulation is polyolefin;

(c) the brown (Brn) twisted pair has a lay length of 1.0" and the brown insulation is Teflon; (d) the orange (Org) twisted pair has a lay length pf 0.675" and the orange insulation is Teflon. (Teflon is a trademark of DuPont)

TABLE 1

1585A[1] Green Pair Replacement
ATTENUATION .772 20 MHz
TESTED
Cpk Summary
CPk on a per cable basis 4.06
Cpk of each pair for all frequencies

| Blue | Brown | Green | Orange |
|------|-------|-------|--------|
| 5.37 | 3.24  | 8.84  | 4.06   |

| Freq. | Spec. | Avg. Blu | Avg. Brn | Avg. Grn | Avg. Org | Std. Blu | Std. Brn | Std. Grn | Std. Org |
|-------|-------|----------|----------|----------|----------|----------|----------|----------|----------|
| 0.772 | −5.50 | −4.94 | −4.98 | −4.87 | −5.09 | 0.01 | 0.04 | 0.02 | 0.02 |
| 1 | −6.26 | −5.61 | −5.66 | −5.58 | −5.82 | 0.02 | 0.05 | 0.02 | 0.03 |
| 4 | −12.34 | −11.20 | −11.33 | −11.05 | −11.63 | 0.04 | 0.10 | 0.05 | 0.05 |
| 8 | −17.56 | −15.93 | −18.12 | −15.69 | −16.56 | 0.05 | 0.14 | 0.06 | 0.08 |
| 10 | −19.71 | −17.88 | −18.10 | −17.60 | −18.58 | 0.06 | 0.15 | 0.07 | 0.09 |
| 16 | −25.16 | −22.78 | −23.06 | −22.45 | −23.66 | 0.07 | 0.21 | 0.09 | 0.11 |
| 20 | −28.26 | −25.54 | −25.87 | −25.18 | −28-54 | 0.08 | 0.23 | 0.11 | 0.12 |

TABLE 2

1585A1 (Reels 1–15) Green Pair Replacement
Attenuation 20–100 MHz
Tested
Cpk Summary
Cpk on a per cable basis 1.40
Cpk of each pair for all frequencies

| Blue | Brown | Green | Orange |
|------|-------|-------|--------|
| 2.08 | 1.32  | 2.27  | 1.67   |

| Freq. | Spec | Avg Blu | Avg. Brn | Avg. Grn | Avg. Org | Std. Blu | Std. Brn | Std. Grn | Std. Org |
|-------|------|---------|----------|----------|----------|----------|----------|----------|----------|
| 20 | −2.83 | −2.56 | −2.59 | −2.52 | −2.66 | 0.01 | 0.03 | 0.01 | 0.01 |
| 25 | −3.18 | −2.87 | −2.91 | −2.84 | −2.99 | 0.01 | 0.03 | 0.01 | 0.02 |
| 31.25 | −3.57 | −3.23 | −3.26 | −3.18 | −3.35 | 0.01 | 0.03 | 0.02 | 0.02 |
| 62.5 | −5.18 | −4.66 | −4.71 | −4.60 | −4.83 | 0.03 | 0.05 | 0.02 | 0.03 |
| 100 | −6.70 | −6.02 | −6.07 | −5.96 | −6.23 | 0.08 | 0.10 | 0.08 | 0.06 |

TABLE 3

1585A1 Crosstalk Summary
Tested
Green Pair Sub
1535a1 .772 to 100 MHz

| Reel # | Bl/Br | Bl/Gr | Bl/Or | Gr/Br | Gr/Or | Or/Br | MlN | Avg | Std | Cpk |
|--------|-------|-------|-------|-------|-------|-------|-----|-----|-----|-----|
| 1 | 7.9 | 7.5 | 12.3 | 9 | 12.4 | 8.4 | 7.5 | 5.6 | 1.2 | 1.6 |
| 2 | 5.9 | 8 | 10.8 | 6.7 | 12.7 | 7.1 | 5.9 | | | |
| 3 | 6.2 | 7.6 | 11.1 | 8.6 | 11.1 | 7 | 6.2 | | | |
| 4 | 7.6 | 5.8 | 9.6 | 8 | 11.6 | 8.1 | 5.8 | | | |
| 5 | 7.6 | 9.2 | 9.1 | 9.2 | 15.8 | 6.1 | 6.1 | | | |
| 6 | 3.8 | 8.5 | 9.0 | 9.6 | 12.0 | 6.6 | 3.8 | | | |
| 7 | 3.6 | 8.5 | 10.6 | 9.0 | 13.4 | 8.6 | 3.6 | | | |
| 8 | 7.0 | 7.1 | 7.2 | 8.1 | 13.1 | 7.3 | 7.0 | | | |
| 9 | 3.5 | 9.5 | 9.3 | 5.9 | 11.7 | 10.7 | 5.9 | | | |
| 10 | 5.0 | 5.9 | 10.7 | 9.1 | 9.8 | 6.9 | 5.0 | | | |
| 11 | 5.3 | 8.3 | 8.0 | 8.6 | 13.4 | 6.6 | 5.3 | | | |

TABLE 3-continued

| 12 | 6.0 | 6.2 | 8.4 | 7.6 | 12.3 | 10.1 | 6.0 |
|---|---|---|---|---|---|---|---|
| 13 | 3.7 | 5.8 | 12.3 | 8.0 | 12.9 | 8.0 | 3.7 |
| 14 | 8.3 | 9.4 | 10.2 | 10.7 | 7.4 | 8.1 | 7.4 |
| 15 | 6.6 | 5.3 | 8.7 | 8.5 | 12.3 | 11.3 | 5.3 |

TABLE 4

1585N1 Crosstalk Summary
Tested
Green pair Sub
1585a1 80–100 MHz

| Reel # | Bl/Br | Bl/Gr | Bl/Or | Gr/Br | Gr/Or | Or/Br | MlN | Avg | Std | Cpk |
|---|---|---|---|---|---|---|---|---|---|---|
| 1 | 18.5 | 18.2 | 18.6 | 14.4 | 17.7 | 18.2 | 14.4 | 14.1 | 1.6 | 2 |
| 2 | 16.7 | 17.3 | 21 | 15.9 | 21.1 | 21.8 | 15.9 | | | |
| 3 | 16.4 | 15.3 | 20.9 | 18.5 | 23.8 | 16.5 | 15.3 | | | |
| 4 | 15.7 | 18 | 22.1 | 18.3 | 18.3 | 16.6 | 15.7 | | | |
| 5 | 16.1 | 11.5 | 21.7 | 17.8 | 23.5 | 21.4 | 11.5 | | | |
| 6 | 11.4 | 15.8 | 22.8 | 19.8 | 20.2 | 15.0 | 11.4 | | | |
| 7 | 15.3 | 16.8 | 19.1 | 17.0 | 20.5 | 11.0 | 11.0 | | | |
| 8 | 22.1 | 18.3 | 21.1 | 19.9 | 19.6 | 13.4 | 13.4 | | | |
| 9 | 21.4 | 13.2 | 19.0 | 21.4 | 22.9 | 20.2 | 13.2 | | | |
| 10 | 15.7 | 17.3 | 19.2 | 16.8 | 22.0 | 15.5 | 15.5 | | | |
| 11 | 15.5 | 17.8 | 17.8 | 15.4 | 22.0 | 14.7 | 14.7 | | | |
| 12 | 16.3 | 15.4 | 18.1 | 19.2 | 22.8 | 14.1 | 14.1 | | | |
| 13 | 17.7 | 15.7 | 15.8 | 20.4 | 21.0 | 18.4 | 15.7 | | | |
| 14 | 19.7 | 15.3 | 19.8 | 17.0 | 20.3 | 18.1 | 15.3 | | | |
| 15 | 14.6 | 14.8 | 20.0 | 16.1 | 22.9 | 15.3 | 14.6 | | | |

TABLE 5

Skew tests results are as follows:

| Sample | Footage | Max Skew (ns/100 m) | Max Skew % |
|---|---|---|---|
| cd6508 | 829 | 21.0 Green to Brown | 4.63% |
| 1585A1(1) | 1001 | 18.3 Green to Brown | 4.02% |
| 1585A1(2) | 335 | 20.0 Green to Brown | 4.40% |
| 1585A1(3) | 1000 | 19.6 Green to Brown | 4.30% |
| 1585A1(4) | 1000 | 19.7 Green to Brown | 4.33% |
| 1585A1(5) | 1000 | 21.6 Green to Brown | 4.79% |
| 1585A1(6) | 1000 | 19.7 Green to Brown | 4.38% |
| 1585A1(7) | 1000 | 19.7 Green to Brown | 4.34 |
| 1585A1(8) | 1000 | 19.0 Green to Brown | 4.20% |
| 1585A1(9) | 1000 | 20.3 Green to Brown | 4.47% |

These results show a max./min. of 21 and 18.3 nS/100 m which falls within the proposed AT & T specification of 50 ns/100 m max. These are the results of the first run of 1585a1 conductors. SUMMARY OF DATA ANALYSIS The data analysis for the 1585A1 green pair sub DFM run; the CpK's are as follows:

| | |
|---|---|
| Atten. 0.772 – 20 | 4.06 |
| Atten. 20 = 100 | 1.40 |
| Imp. (Worst Case) | 1.80 |
| SRI. (Worst Case) | 7.39 |
| Crosstalk | 1.60 and 2.9 |

Skew was 30.4 and 32.4 nS/100 meters for two samples tested,

One way to measure the amount of structural variation in a cable is by sending a signal along the transmission line (cable path) and measuring the amount of energy reflected back towards the testing apparatus. Sometimes the reflected electrical energy peaks at particular frequencies (often referred to as "spikes" within the cable industry). This is the result of a cylindrical variation in the construction which matches the cyclical wave (or frequency) propagating down the cable. The more energy reflected back, the less energy is available at the other end of the cable.

The actual reflected energy can be predicted by the impedance stability of the transmission line. If a 100 ohm impedance signal is sent down the cable, any part of the cable which is not exactly 100 ohms will cause a reflection. One of the features of the twisted pair conductor 21 is that it has a center-to-center distance d (FIG. 4) measured in a plane perpendicular to the longitudinal centers of the twisted pair conductor 21 and between the centers of adjacent conductors is ±0.03 times the average of d with the variation not being any more than this.

To measure the variation of d in our twisted pair cables, we randomly select at least three and preferably twenty 1000 ft. samples of cable of the same size from either the same run or at least three separate successive runs with each of the runs occurring on a separate day or 24 hour period. The average of d is calculated by taking at least 20 measurements on each selected 1000 ft. cable with each measurement taken at least 20 ft. apart, totalling all the measurements taken and dividing the total by number of measurements taken. All of the d measurements for our cable must fall within the tolerances of ±0.03 times the average of d. If any one measurement does not, then the entire run or runs are discarded.

For example, in one run of 24 AWG twisted pair conductors having a radially joined dielectric layer that did not pass our requirements, the twisted pair conductor had a center-to-center average spacing of 0.0353 inches. The average was determined by measuring d in inches for three 1000 ft. lengths of cable with 20 measurements taken in at least 20 ft. intervals on each twisted pair conductor.

The run is not in conformance with the present invention because there are measurements outside of the acceptable range. In this case, the range of acceptable d is from 0.0342 to 0.0364 inches, i.e., 0.0353 (the average)±0.0011 (0.03× 0.0353). Since in the below example there are measurements outside this tolerance, the twisted pairs in all the run or runs would be rejected.

| Sample | Twisted Pair Conductor 1 (d) in ohms | Twisted Pair Conductor 2 (d) in ohms | Twisted Pair Conductor 3 (d) in ohms |
|---|---|---|---|
| 1 | .0355 | .0364 | .0344 |
| 2 | .0352 | .0368 | .0340 |
| 3 | .0358 | .0364 | .0341 |
| 4 | .0353 | .0357 | .0346 |
| 5 | .0348 | .0352 | .0344 |
| 6 | .0340 | .0356 | .0348 |
| 7 | .0347 | .0356 | 0352 |
| 8 | .0349 | .0359 | 0345 |
| 9 | .0355 | .0367 | .0341 |
| 10 | .0362 | .0362 | .0347 |
| 11 | .0367 | .0366 | .0352 |
| 12 | .0363 | .0363 | .0350 |
| 13 | .0354 | .0356 | .0356 |
| 14 | .0348 | .0347 | .0354 |
| 15 | .0345 | .0355 | .0351 |
| 16 | .0344 | .0352 | .0345 |
| 17 | .0351 | .0359 | .0344 |
| 18 | .0356 | .0363 | .0341 |
| 19 | .0351 | .0366 | .0336 |
| 20 | .0347 | .0368 | .0335 |
| TOTAL | .7045 | .7194 | .6912 |

Cable Totals
1 + 2 + 3 divided by 60    .0353

An alternative and/or combined feature of our twisted pair conductors is that each has an impedance of from 90 to 110 ohms when measured at frequencies of about 10 MHz to about 200 Hz with a tolerance of about ±5% or ±0.05 times the average impedance. The average impedance is calculated as stated above. The preferred manner in calculating the average impedance is taking at least 200 impedance measurements between 10 and 200 MHz on one of twenty consecutive 1000 ft twisted pair conductors taken from the same run with each of the 200 impedance measurements being taken in less than 0.5 MHz increments.

If any of the impedance measurement between 10 and 200 MHz vary by more than or less than 0.05 times the average impedance in the one twisted pair conductor then the cable run is not acceptable and the entire run is discarded.

For example, if the average impedance is 96.2 ohms, no impedance measurement taken between 10 MHz and 200 MHz can be greater than 101.0 ohms (96.2+4.8[96.2×0.05]) or less than 91.4 ohms (96.2+4.8[96.2×0.05]).

The average impedance is calculated in the usual manner i.e. adding all of the impedance measurements and dividing the total by the number of impedance measurements.

Further, the adhesion strength of the radially joined twisted pair conductors is preferably such that the individual insulated conductors may be pulled apart after an initial cut by finger nail or appropriate tool by hand with the same or less pull that is needed to remove a normal band aid from a scratch.

The pulling apart of the twist pairs for at least an inch, leaves the insulation substantially intact over the separated portion and does not disturb the twist. This adhesion feature permits the insulated conductors of a twisted pair to be separated without causing the twist to unravel and separate.

The adhesion strength is determined by holding one insulated conductor and pulling the other insulated conductor. The adhesion strength of the twisted pair 21 that substantially leaves the insulation 24 and 25 substantially intact is between 0.1 and 5 lbs. force and preferably between 0.25 and 2.5 lbs. force.

The above data is for purposes of illustration rather than limitation of the scope of protection accorded this invention. The latter is to be measured by the following claims, which should be interpreted as broadly as the invention permits.

The invention claimed is:

1. A plenum cable comprising:
a plurality of twisted pair conductors, each of said twisted pair conductors having a lay length of between 0.4 to 1.25 inches, at least one of said plurality of twisted pair conductors having a first lay length of about 1.0 to 1.25 inches, and at least another of said plurality of twisted pair conductors having a second lay length of about 0.5 to less than 1.0 inches wherein said at least one twisted pair conductor has insulating material selected from the group consisting of flame retardant polyethylene and flame retardant polypropylene and said at least another twisted pair conductor has insulating material selected from the group consisting of fluorinated ethylene propylene, tetrafluoroethylene, ethylene chlorotrifluoroethylene, and copolymers of tetrafluoroethylene with perfluoroalkoxy.

* * * * *

UNITED STATES PATENT AND TRADEMARK OFFICE
CERTIFICATE OF CORRECTION

PATENT NO. : 5,770,820
DATED : June 23, 1998
INVENTOR(S) : Harry Nelson, Douglas O'Brien, and
Robert D. Kenny It is certified that error appears in the above-identified patent and that said Letters Patent is hereby corrected as shown below:

Column 9, Table 1, @ column (Avg Org), row (Freq 20):
delete "-28-54" and insert -- -25.54--

Column 10, Table 3, @ column (BlBr), row (Reel #9):
delete "3.5" and insert --8.5--

Column 10, Table 3, @ column )Or/Br), row (Reel #8):
delete "7.3" and insert --7.8--

Column 11, Table 5, @ column (max skew %) row (Sample 1585A1(7)):
delete "4.34" and insert --4.34%--

Column 11, Line 57, delete "20=100" and insert --20-100--

Column 14, Line 2, delete "96.2+4.8" and insert --96.2-4.8--

Signed and Sealed this

Twenty-ninth Day of December, 1998

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,770,820

DATED : June 23, 1998

INVENTOR(S) : Harry Nelson, Douglas O'Brien, and
Robert D. Kenny

It is certified that error appears in the above-identified patent and that said Letters Patent is hereby corrected as shown below:

Title Page after Inventors insert:
--[73] Assignee: Belden Wire & Cable Company
                  Richmond, Indiana--

Signed and Sealed this

Fourteenth Day of September, 1999

Attest:

Q. TODD DICKINSON

*Attesting Officer*      *Acting Commissioner of Patents and Trademarks*